Aug. 26, 1952     R. E. MALMQUIST     2,608,459
TACKLE BOX
Filed Dec. 16, 1950
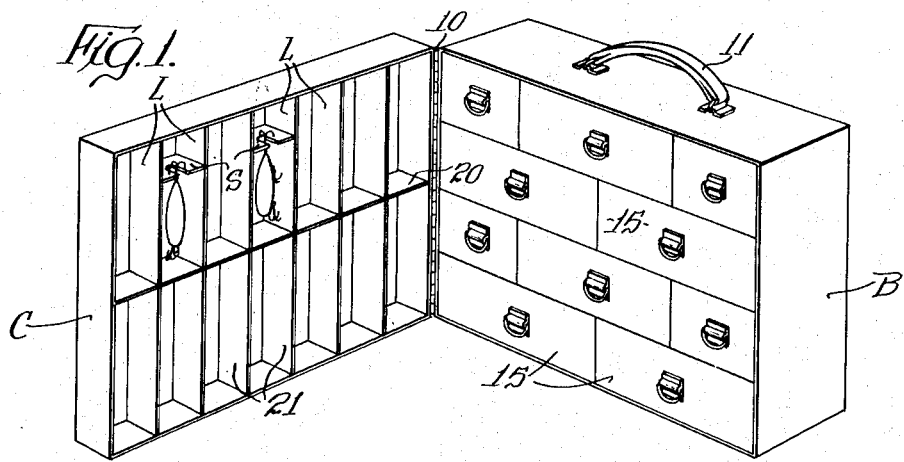
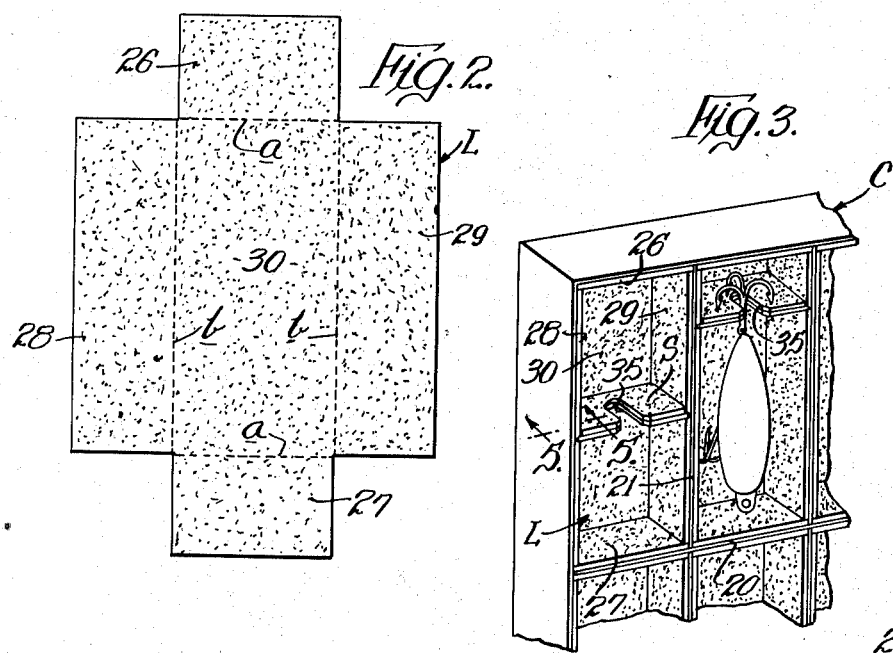
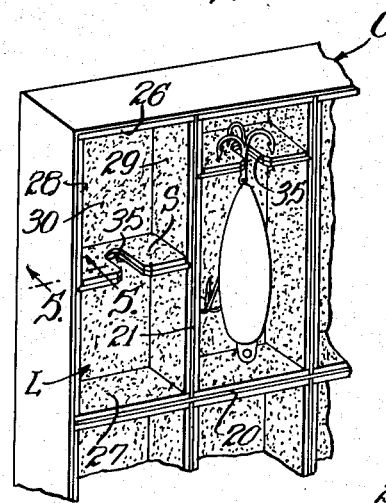
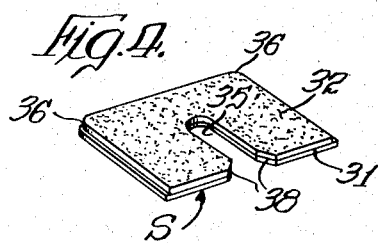
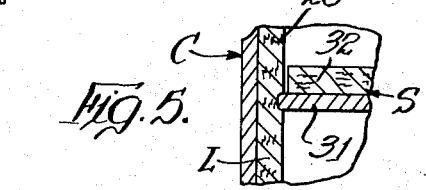
INVENTOR.
Robert E. Malmquist Patented Aug. 26, 1952

2,608,459

UNITED STATES PATENT OFFICE 2,608,459

TACKLE BOX

Robert E. Malmquist, Evanston, Ill.

Application December 16, 1950, Serial No. 201,137

5 Claims. (Cl. 312—351)

This invention which relates in general to a box for fishing tackle and the like is concerned specially with the provision of adjustable shelves within vertically elongated compartments therein, and with a frictional means whereby such shelves may be supported in any selected position of adjustment.

In a box which contains fishing tackle, artificial baits of different kinds usually require accommodation. When wet, these baits cannot readily dry if placed away in the tackle box. Some dripping of water occurs, with consequent corrosion of metal parts and creation of a moist atmosphere which is detrimental to the fishing lines and other equipment.

According to this invention, I provide in a tackle box supporting means whereby artificial baits and the like may be suspended and maintained out of contact with each other. For this purpose the box is provided with a plurality of vertically elongated compartments, each having an open face upon one side. The remaining sides of each compartment are lined with a compressible, water resistant, material which may be of cork or a cork composition in sheet form. In addition, the lining of such a material is adapted to engage frictionally with opposite edges of a shelf when fitted tightly between opposite sides of a compartment, the shelf then constraining the lining to compress slightly whereby the shelf is sustained in a selected position of vertical adjustment. Each shelf is desirably slotted to receive therein one of the gang hooks which is usually attached to an artificial bait, the bait thereby being suspended below the shelf so that any dripping of water therefrom will fall harmlessly onto the cork lining at the base of the compartment.

In general the present invention is concerned with the provision of a frictional compressible lining inserted within a vertically elongated compartment in a box which is designed to contain fishing tackle or the like; it is also directed specifically to other features of improvement, one being the form of the blank from which the lining is produced and which contributes to a tensioned engagement thereof with the walls of the compartment, and another being to the construction of the shelf which is of composite character to provide a thrust-exerting material in compressive engagement with the compartment lining and a top facing of cork or the like which is impervious to the action of water dripping thereon from the bait hooks in engagement therewith.

These and other objects of my invention may be realized from a construction such as is illustrated in the accompanying drawing wherein:

Figure 1 is a view in perspective of a conventional tackle box having a drawer-containing body equipped with a cover wherein is a plurality of vertically elongated compartments each open upon its face which confronts the box body when the cover is in closed position thereupon;

Fig. 2 is a view in plan of the sheet blank ready to be formed up for insertion in one of the cover compartments to provide a lining for its back, its opposite sides, and its opposite ends;

Fig. 3 is a fragmentary perspective view showing two of the compartments with shelves installed therein, one of the shelves supporting a depending bait within the compartment;

Fig. 4 is a view in perspective of one of the shelves per se; and

Fig. 5 is an enlarged detail in section, taken on line 5—5 of Fig. 3.

As herein shown, the tackle box comprises a body B having a cover C which is hinged thereto at 10 along a vertical axis. A handle 11 affixed to the top of the body provides a convenient medium for carrying the box. Any suitable lock (not shown) may be used to hold the cover in closed position upon the body.

The body B, as shown, is partitioned to accommodate a plurality of sliding drawers 15, this arrangement, however, being optional. The cover C is divided into a plurality of compartments and for this purpose I may employ a central horizontal partition 20 and vertical partitions 21 arranged on opposite sides thereof. Each of the compartments thus provided in the cover is characterized by a back wall, opposite walls, top and bottom walls, and an open face arranged to confront the box body B when the cover is closed thereupon.

The lining of this invention is applied to any or all of the cover compartments and for this purpose I utilize a lining L in the form of a sheet which is produced from the sheet blank of Fig. 2. This sheet is made of cork or a cork-like material, and is of generally rectangular form with tabs 26 and 27 extended centrally at opposite ends and other elongated tabs 28 and 29 extended centrally along opposite sides. A dotted line $a$ defines a bend line for each end tab and other dotted lines $b$ define bend lines for the side tabs. When folded along the bend lines, the blank provides in its two end tabs 26 and 27 linings for the top and bottom of each compartment and in the two side tabs 28 and 29 linings for the opposite sides of each compartment. The central rectangular panel 30 of each blank corresponds substantially in size and shape to the back of each compartment into which it is fitted. A one-piece lining of this character when installed within a compartment of the cover C may, if desired, be adhered thereto by any suitable cement, although in some cases this may be found to be unnecessary.

For use with such a lining, I provide a shelf S, as shown in Figure 4. This comprises a base 31 of sheet metal or the like to whose top side is applied a facing of cork or cork-like material. A slot 35 is extended inwardly from the forward edge of each shelf for a substantial distance probably somewhat past the center thereof. Such a slot is, in effect, a bifurcation providing two springable end portions which may be advanced inwardly toward each other very slightly in response to a compression force of sufficient magnitude. The facing 32 at opposite ends if desirably inset slightly from the corresponding edges of the shelf base 31, and the rear corners 36 of the shelf are desirably rounded or beveled slightly as shown clearly in Fig. 4. A flaring entrance 39 may be provided for the slot 35 to facilitate lateral movement of a hook shank therethrough when it is desired to suspend a bait therefrom.

In practice, one of the shelves may be frictionally fitted between opposite lined walls of a compartment, as shown best in Figure 3. When so installed, the shelf base 31 which is capable of exerting opposite thrust forces against the engaged lining acts to compress the lining somewhat at the points of engagement (see Fig. 5) thereby to provide a substantially positive interlocking connection therebetween. Although the edge of the metal base of each shelf lies somewhat inwardly of the lining face where compression takes place, the top facing 32 of the shelf need not engage therewith because of its inset spacing (see Fig. 5). As a result of this relationship of the interengaged portions of the shelf and lining, a firm frictional anchorage for each shelf, augmented by the inwardly sprung ends thereof, is provided at any selected position of vertical adjustment.

To move the shelf from one position to another with a minimum of resistance, it may be advantageous to pull the shelf out horizontally and then push it in again at the different elevations where a new line of compression is to be established with the opposite linings of the compartment wherein the shelf is installed. Any grooves formed in the lining due to its being compressed by the shelf, will ordinarily disappear after the shelf is removed, so that the lining 18 will thereafter remain smooth and free of irregularities. In normal use of a tackle box having the features of my invention, any readjustment of shelves in the compartments will be a rather infrequent occurrence. However, it is important that they do be capable of such readjustment to accommodate baits or other articles which are to be suspended in place.

The construction herein described is advantageous not only from the standpoint of simplicity in that each shelf may be fitted in place at a desired location vertically of the compartment wherein it is accommodated, but may also be shifted to any other location therewithin, all without the use of any tools or special appliances. Inasmuch as baits and other articles vary greatly in size and shape, it may be necessary to change the positions of the supporting shelves where these articles are to be suspended in place and, as above noted, this operation is a simple one indeed. Furthermore, the compartments are protected by the water resistant lining of cork or the like so that any dripping of water will not prove injurious thereto. This observation applies equally to the shelves themselves. A further advantage is the lightness in weight which is adherent in such a construction, the buoyancy of cork being a well-known property that is highly advantageous in a portable box or case of the kind just described.

I claim:

1. In a box for fishing tackle or the like of the type which provides a compartment having one open vertical face, the feature of improvement which comprises two opposite vertical walls of the compartment having smooth confronting faces, a resilient lining applied to each of the smooth confronting faces of the compartment walls to receive therefrom a uniform unbroken backing, and a supporting shelf extended horizontally between said linings for pressure engagement therewith and sufficiently rigid to transmit oppositely directed thrust forces to the lining, counter to a uniform resistance at every point thereon, for compression thereof at points adjacent the shelf engagement therewith, the shelf being thereby supported fixedly in any selected position of adjustment vertically of the compartment.

2. In a box for fishing tackle or the like of the type which provides a compartment having one open vertical face, the feature of improvement which comprises two opposite vertical walls of the compartment having smooth confronting faces, a resilient lining applied to each of the smooth confronting faces of the compartment walls to receive therefrom a uniform unbroken backing, and a bifurcated supporting shelf having springable ends extended horizontally between said linings for resilient pressure engagement therewith and sufficiently rigid to transmit oppositely directed thrust forces to the lining, counter to a uniform resistance at every point thereon, for resilient compression thereof at points adjacent the shelf engagement therewith, the shelf being thereby supported fixedly in any selected position of adjustment vertically of the compartment.

3. In a box for fishing tackle or the like of the type which provides a compartment having one open vertical face, the feature of improvement which comprises two opposite vertical walls of the compartment having smooth confronting faces, a resilient lining applied to each of the smooth confronting faces of the compartment walls to receive therefrom a uniform unbroken backing, and a supporting shelf extended horizontally between said linings for pressure engagement therewith and sufficiently rigid to transmit oppositely directed thrust forces to the lining, counter to a uniform resistance at every point thereon, for compression thereof at points adjacent the shelf engagement therewith, the shelf being thereby supported fixedly in any selected position of adjustment vertically of the compartment, and a top facing for the shelf extending toward its opposite ends but stopping short thereof to remain out of engagement with the compartment linings when the shelf is compressively engaged therewith.

4. In a box for fishing tackle or the like of the type which provides a compartment having one open vertical face, the feature of improvement which comprises a one-piece resilient lining extended over the several faces of the compartment, opposite vertical walls having smooth confronting faces in contact at substantially every point with the adjacent faces of the resilient lining and providing therefor a smooth unbroken backing and a supporting shelf extended horizontally between vertical walls of the compartment for pressure engagement with the lined faces thereof and sufficiently rigid to transmit oppositly directed thrust forces thereto, counter to a uniform resistance at every point thereon, for compression thereof at points adjacent the shelf engagement therewith, the shelf being therebly supported fixedly in any selected position of adjustment vertically of the compartment and being detachable therefrom with minimum resistance by a straight outward movement in the plane of its own body.

5. In a box for fishing tackle or the like of the type which provides a compartment having one open vertical face, the feature of improvement which comprises a one-piece resilient lining applied to several faces of the compartment, two of the confronting vertical faces being smooth to provide for the lining a uniform unbroken backing, and a bifurcated supporting shelf having springable ends extended horizontally between vertical walls of the compartment for resilient pressure engagement with the lined faces thereof and sufficiently rigid to transmit oppositely directed thrust forces thereto, counter to a uniform resistance at every point thereon, for resilient compression thereof at points adjacent the shelf engagement therewith, the shelf being thereby supported fixedly in any selected position of adjustment vertically of the compartment and being detachable therefrom with minimum resistance by a straight outward movement in the plane of its own body.

ROBERT E. MALMQUIST.

REFERENCES CITED

The following references are of record in the file of this patent:

UNITED STATES PATENTS

| Number | Name | Date |
|---|---|---|
| 1,712,054 | Sheard | May 7, 1929 |
| 2,123,031 | Weiner | July 5, 1938 |
| 2,315,833 | Baron | Apr. 20, 1943 |

FOREIGN PATENTS

| Number | Country | Date |
|---|---|---|
| 625,556 | Great Britain | June 29, 1949 |